United States Patent [19]

Leach et al.

[11] Patent Number: 5,132,617

[45] Date of Patent: Jul. 21, 1992

[54] METHOD OF MEASURING CHANGES IN IMPEDANCE OF A VARIABLE IMPEDANCE LOAD BY DISPOSING AN IMPEDANCE CONNECTED COIL WITHIN THE AIR GAP OF A MAGNETIC CORE

[75] Inventors: Michael A. Leach, South Burlington; Brian J. Machesney, Burlington; Edward J. Nowak, Essex Junction, all of Vt.

[73] Assignee: International Business Machines Corp., Armonk, N.Y.

[21] Appl. No.: 525,352

[22] Filed: May 16, 1990

[51] Int. Cl.⁵ .......... G01B 7/14; G01R 27/26; B24B 49/04; H01L 21/306
[52] U.S. Cl. .......... 324/207.16; 51/165.74; 156/627; 324/71.2; 324/207.19; 324/207.22; 324/226; 324/229; 324/657
[58] Field of Search .......... 324/71.2, 207.15, 207.16, 324/207.17, 207.18, 207.19, 207.22, 207.26, 226, 229–231, 654–657, 725, 726; 156/627; 51/165 R, 165.74

[56] References Cited

U.S. PATENT DOCUMENTS

| | | | |
|---|---|---|---|
| 2,004,780 | 6/1935 | Churcher | 171/95 |
| 3,229,196 | 1/1966 | Neale | 324/230 |
| 3,961,243 | 6/1976 | Schulz | 324/207.19 |
| 4,014,141 | 3/1977 | Riddle et al. | 51/165 R |
| 4,188,267 | 2/1980 | Seger et al. | 324/551 X |
| 4,197,676 | 4/1980 | Sauerland | 51/165 R |
| 4,328,462 | 5/1982 | Jensen | 324/229 |
| 4,339,714 | 7/1982 | Ellis | 324/207.16 |
| 4,433,510 | 2/1984 | Katagiri et al. | 51/165 R |
| 4,793,895 | 12/1988 | Kaanta et al. | 156/636 X |
| 4,804,912 | 2/1989 | Lysén | 324/207.17 |
| 4,857,828 | 8/1989 | Celine | 324/61 R |

FOREIGN PATENT DOCUMENTS

| | | |
|---|---|---|
| 270843A3 | 8/1989 | Fed. Rep. of Germany . |
| 2230965 | 12/1974 | France . |
| 1013928 | 12/1965 | United Kingdom . |
| 1528505 | 10/1978 | United Kingdom . |
| 1538415 | 1/1979 | United Kingdom . |

OTHER PUBLICATIONS

"Handbook of Electronic Control Circuits", John Markus, McGraw-Hill Book Co., Inc., 1959, pp. 167, 168.
"Detecting Undesired Breaks in Metal Ladders", F. J. Soychak, IBM Tech. Discl. Bulletin, Sep. 1966, pp. 358–359.
"Magnetic Head Lapping Method" F. W. Hahn, Jr., IBM Tech. Discl. Bulletin, Apr. 1974, p. 3509.

*Primary Examiner*—Gerard R. Strecker
*Attorney, Agent, or Firm*—Calfee Halter & Griswold

[57] ABSTRACT

The present invention relates to a method and apparatus for remotely detecting impedance. It is specifically adapted for use on a polishing machine wherein the end point of polishing for removing a surface layer during the processing of semiconductor substrates is detected. A first, or stationary coil having a high permeability core is wound having an air gap and an AC voltage is applied to the stationary coil to provide a magnetic flux in the air gap. A second coil is mounted for rotation on the polishing table, in a position to periodically pass through the air gap of the stationary coil as the table rotates. The second coil is connected at its opposite ends to contacts which are embedded in the surface of the polishing wheel. The contacts are positioned to engage the surface of the substrate which is being polished and provide a load on the second or rotating coil. The rotating coil, when it is in the air gap of the stationary coil, will perturb the flux field therein as a function of the resistance of the load caused by the contacts contacting either a conducting surface or a non-conducting surface. This perturbance of the flux field is measured as a change in the induced voltage in the stationary coil which in turn is converted to a signal which is processed to indicate the end point of polishing, the end point being when a metallic layer has been removed to expose a dielectric layer therebeneath or, conversely, when a dielectric layer has been removed to expose a metallic layer therebeneath.

9 Claims, 3 Drawing Sheets

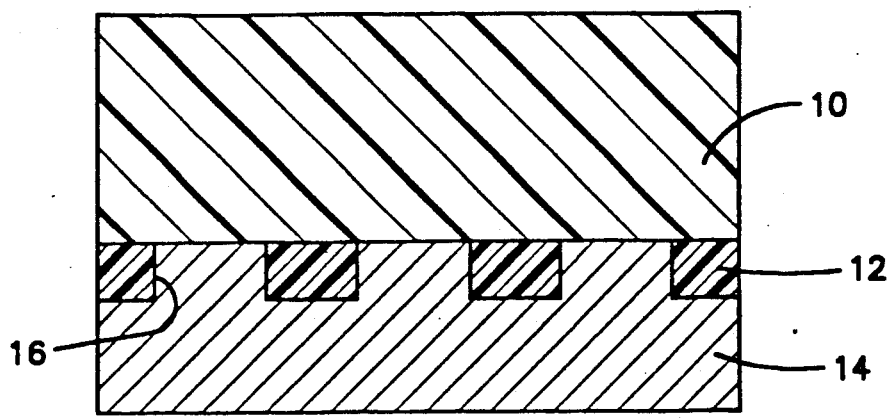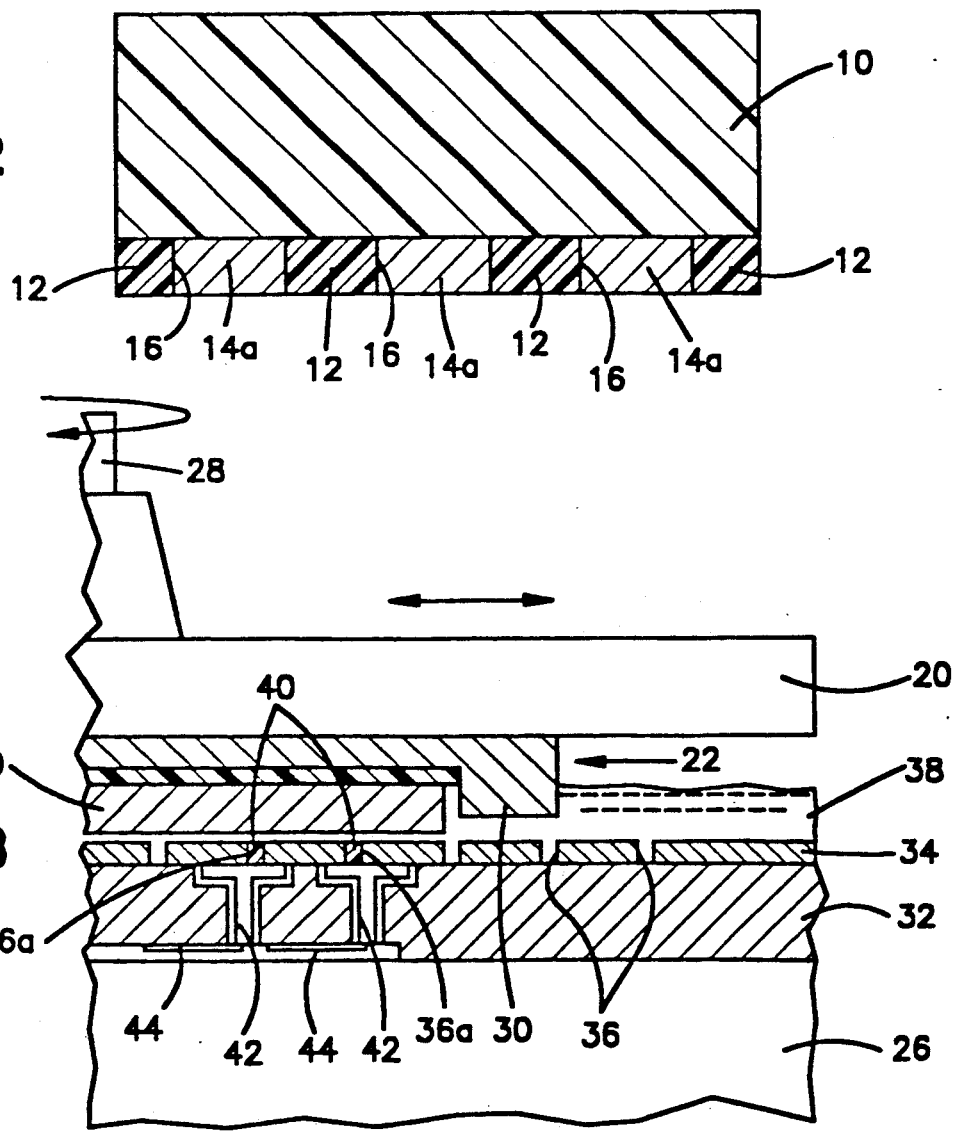

METHOD OF MEASURING CHANGES IN IMPEDANCE OF A VARIABLE IMPEDANCE LOAD BY DISPOSING AN IMPEDANCE CONNECTED COIL WITHIN THE AIR GAP OF A MAGNETIC CORE

FIELD OF THE INVENTION

This invention relates generally to an apparatus and method for remotely detecting impedance, and more particularly to the use of such a method and apparatus for determining the end point of a polishing operation performed on a multi-layer article wherein one layer of material is removed to reveal an underlying surface of another material having different electrical characteristics.

In more particular aspects, this invention is specifically directed to an end point detector for chemical-mechanical polishing of semiconductor wafers to remove various surface layers of material which are applied during manufacturing operations.

BACKGROUND OF THE INVENTION

There are many different types of lapping or polishing machines including those specifically designed or adapted for reducing the thickness of semiconductor wafers by removing various layers of material added during manufacturing. One such device and its use is described in U.S. Pat. No. 4,793,895 assigned to the assignee of the present invention. This patent discloses an end point detector in which a plurality of isolated electrodes are embedded in the lapping pad on the rotating polishing table of the machine, and means are provided for causing and monitoring current flow between the spaced isolated electrodes with the current flow being indicative of the amount of conductive material on the exposed surface layer.

While this machine does perform with reasonable effectiveness, nevertheless there are certain drawbacks, the principal of which is that all of the electronics, including the current inducing and measuring devices must be contained on the rotating table. Hence, the measurements must be transferred from the rotating table to the surrounding monitoring and control equipment. The transfer is achieved by means of either an infra-red transmitter and sensor or some type of slip ring arrangement. With these types of transmissions of data from a rotating member to a stationary member there is occasionally a problem with the accuracy of transmission or the reception of information, due to various types of potential interference with either the infra-red transmitter or sensor, or with electrical or mechanical contact problems in the rotating slip rings.

In any event, it is desirable to provide for the measurement of the end point to be directly recorded on the stationary or non-rotating portion of the equipment without the necessity of transferring data from a rotating member to a stationary member.

According to the present invention, this is accomplished by utilizing an impedance detector which is mounted on the stationary or non-rotating portion of the lapping or polishing machine; and, on the rotating table, means are provided to change the impedance of the detector by perturbing a magnetic flux generated on the stationary portion of the equipment, which change is a function of the amount of material which has been removed from the surface of the wafer. The end point measurement is accomplished without physical contact between the rotating table and the stationary portion of the polishing or lapping machine.

Many prior art references teach various uses of a variety of types of magnetic and electrical coils and circuits for different detection schemes. For example, Myers, R. J. and Rankin, C. J., *Handbook of Electronic Control Circuits*, 1959, Pages 167-168, teaches the monitoring of current in a coil of an electromagnet to detect variations in any current caused by physical flaws in a conductor passed through a magnetic gap. IBM Technical Disclosure Bulletin dated September, 1966, at Pages 358 and 359, shows the use of an electromagnetic coil as a monitor of variations in an external passive conductor which passes through the gap of a coil. U.S. Pat. No. 4,804,912 shows a distance monitor which measures changes in the magnetic coupling between an electromagnetic coil and the surface of a conductive work piece and a grinding machine. In this reference, the active coil acts both as a stimulus for and a detector of the changes caused by a free moving passive field perturbing member and a grinding component. A similar application is described in the article "Magnetic Head Lapping Method" by F. W. Hahn, Jr. in IBM Technical Disclosure Bulletin dated April, 1974, Page 3509 where the signal is read by a magnetic head monitored during the lapping of a gap-forming layer to determine the head transducing gap. A recorded signal in the lapping tape is used to provide the flux perturbing signal.

None of these references suggest a remote impedance detector of the type provided according to this invention.

SUMMARY OF THE INVENTION

According to the present invention, a method and apparatus for detecting the changes in the impedance of a load, which changes in impedance may be representative of an end point reached when polishing a layer of material from an article, is provided. According to this invention, a first magnetic-field-producing coil is provided which includes a core and an air gap in the core. Means are provided for generating a magnetic field in the air gap of the core. A second magnetic-field-producing coil is provided which is coupled to the variable impedance load which is to be measured. The second magnetic field producing coil is disposed in the air gap of the core of the first magnetic field producing coil without physical contact with the coil or core such that the magnetic field in the first coil is perturbed by the magnetic field of the second coil as a function of the variable impedance. The amount of perturbance of the magnetic field in the first coil is measured and a signal is generated representative of the change in load which in turn is a function of the end point of the removal of the layer of material. Preferably, the first coil is on a stationary portion of a polishing or lapping machine and the second coil is on the rotating portion of the lapping or polishing machine, and the load impedance varies as a function of the amount of a surface layer of material being removed from a substrate.

DESCRIPTION OF THE DRAWINGS

FIG. 1 is a stylized view representative of a cross sectional view of a semiconductor wafer during processing having a layer of material thereon to be removed by polishing;

FIG. 2 is a cross-sectional view of a wafer similar to FIG. 1 showing a layer of material having been removed;

FIG. 3 is a simplified cross sectional view, somewhat diagrammatic, of a lapping or polishing machine employing the present invention;

DESCRIPTION OF THE PREFERRED EMBODIMENT

Figure 4:
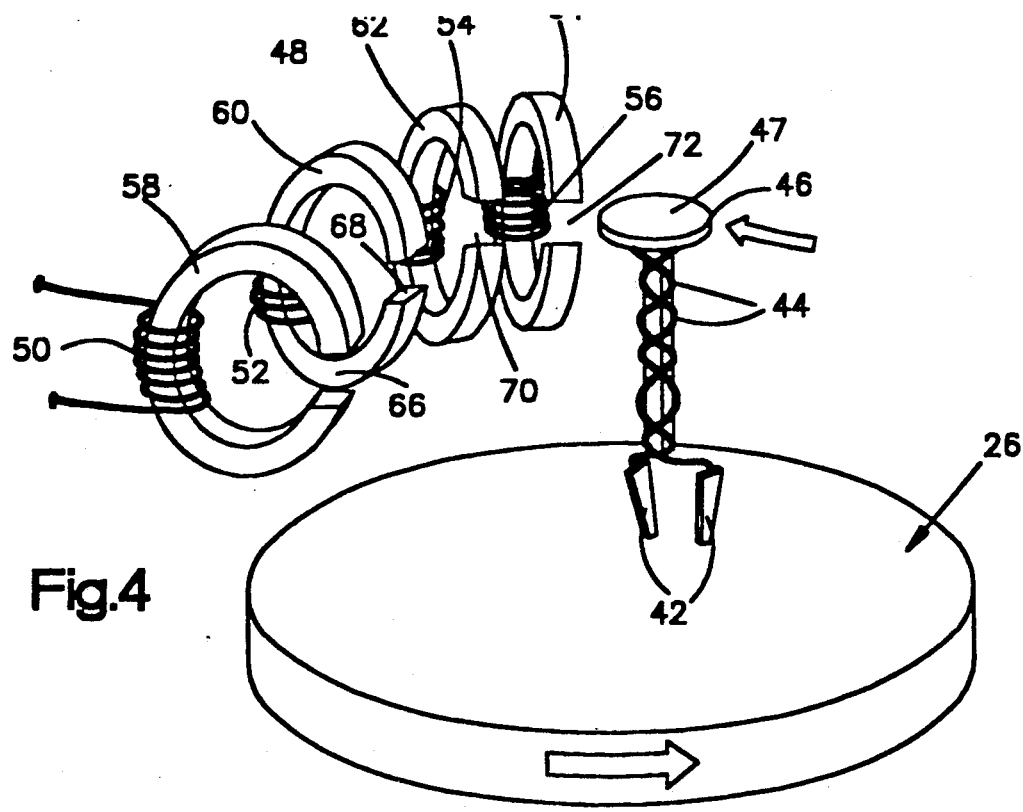
FIG. 4 is a simplified perspective view of the lapping or polishing wheel of the lapping machine employing the present invention.

Referring now to the drawing and, for the present, to FIG. 1, a somewhat stylized diagrammatic cross sectional view of a silicon wafer having several layers of material deposited thereon is shown. It should be understood that this figure does not represent any specific wafer and indeed is a very simplified version of a wafer configuration during processing, the simplification being to demonstrate more clearly the principle of operation of the present invention. It will be understood by persons skilled in the art that the present invention is applicable to end point detection in polishing of material from the most complex configurations of wafers, substrates and various layers thereon.

The wafer shown in FIG. 1 includes a silicon substrate 10 with a dielectric material 12 disposed thereon and a layer of conductive material 14, such as a metal, disposed over the dielectric layer 12. The invention is illustrated with a dielectric layer of material 12 having vias or openings 16 therein into which the conductive material 14 is deposited. This is depicted in order to illustrate an important aspect of the invention wherein a major portion of the top surface layer is removed, yet at the end point there will remain areas of this metal exposed as a portion of the top surface. FIG. 2 is a view similar to FIG. 1 showing the layer of metal 14 removed by polishing or lapping down to the top surface of the dielectric layer 12 while allowing portions 14a of the metal layer to remain in the vias 16 and actually be a part or a portion of the exposed surface at the end point.

The wafer to be polished is disposed in a polishing apparatus of the type shown in FIG. 3. The polisher includes a wafer carrier or holder 20 having a template 22. The wafer which is to be processed in accordance with the invention is positioned in the wafer template 22 and is brought into contact with a polishing pad 34. The wafer carrier or holder 20 is connected to a driving arm 28 which is driven by a suitable motor (not shown) for moving the carrier 20 in both rotational and oscillating directions as shown by the arrows. The template 22 includes an edge flange 30 which prevents the wafer from sliding out from under the wafer template 22 as the carrier moves.

The polishing table 26 includes a platen 32 with a polishing pad 34 disposed thereon. Polishing pad 34 is formed with a plurality of holes or openings 36. A slurry 38 of selected abrasive material in a chemical carrier is placed on the pad, which in conjunction with the pad 34, serves as a polishing medium. The polishing takes place by rotating the polish table 26 and the drive arm 28 so as to cause a chemical-mechanical polishing action to remove the upper surface layer of material 14 from the wafer. Such polishing is described in U.S. Pat. No. 4,671,851.

Figure 7:
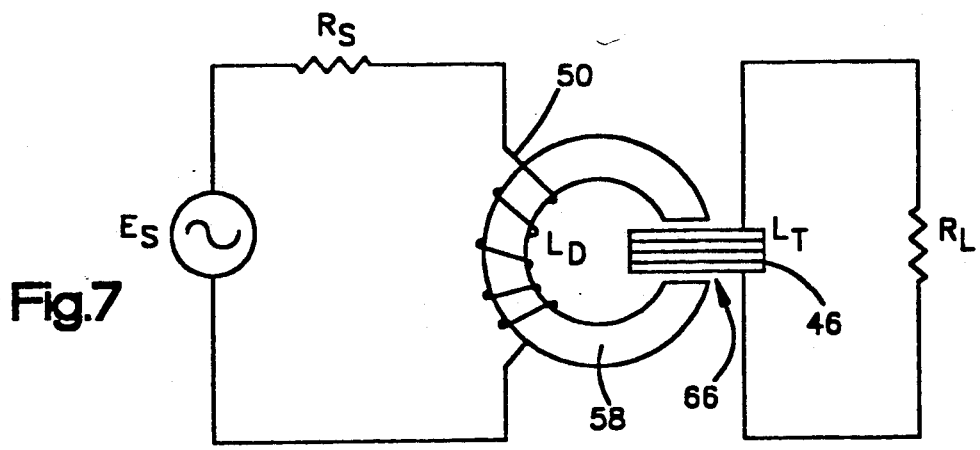
FIG. 7 is a view somewhat diagrammatic of the operation of the present invention employing a rotating coil and a stationary coil.

The end point detector of the present invention includes two of the openings 36a having disposed therein a conductive material 40 such as conductive epoxy or any like electrical conductor. The platen 32 is provided with electrical contacts 42 which are in contact with the conductive material 40. The contacts 42 each have a conductor 44 extending therefrom, portions of which are, like the contacts 42, embedded in the platen 32, and portions of which terminate in a wound coil 46 (FIG. 4). As can be seen in FIG. 4, which is a simplified illustration of the electrical components and connections not shown in FIG. 3, the portions of the conductors 44 not embedded in the platen 32 run up a post extending outwardly from the perimeter of the table 26 and are attached to a coil 46. The coil 46 is wound on a high permeability (e.g. iron) core 47 in a plane parallel with the plane occupied by the table 26 and rotates therewith. The core 47 is generally disc-shaped and the number of turns of wire forming the coil 46 surrounding the edge of the disc may vary depending on the thickness of the wire. As shown in FIG. 7, four turns of wire form the coil 46. The coil and the core are mounted eccentrically on the post so that a major portion of the coil extends beyond the perimeter of the table 26 away from the center of the table. As will be described presently, the action of the conductive material 40 in the openings 36a in conjunction with the surface of the wafer being polished serves as a variable impedance load connected to the coil 46.

Still, referring to FIG. 4, a second coil 48 is provided which in essence is a compound coil which includes four windings 50, 52, 54 and 56 each wound on high permeability (e.g. iron) C-shaped cores 58, 60, 62 and 64, respectively. An A.C. voltage is generated across the windings 50, 52, 54 and 56 from a source (not shown) which creates a flux in the cores 58, 60, 62 and 64. Each of the cores 58, 60, 62 and 64 has an air gap 66, 68, 70 and 72 respectively, while the coil 46 is disposed to rotate through the air gaps 66, 68, 70 and 72 of the cores as the table 26 rotates to polish the wafer. The coil 46 does not make physical contact with the wound coil 50, 52, 54 and 56 or with the cores 58, 60, 62 and 64 but passes through the air gaps 66, 68, 70 and 72. The coil 46 will perturb the magnetic flux in the air gaps as a function of the impedance of the load on the coil 46 and it is this perturbance which is measured and thereby generates a signal indicating the end point of the polishing.

Figure 5:
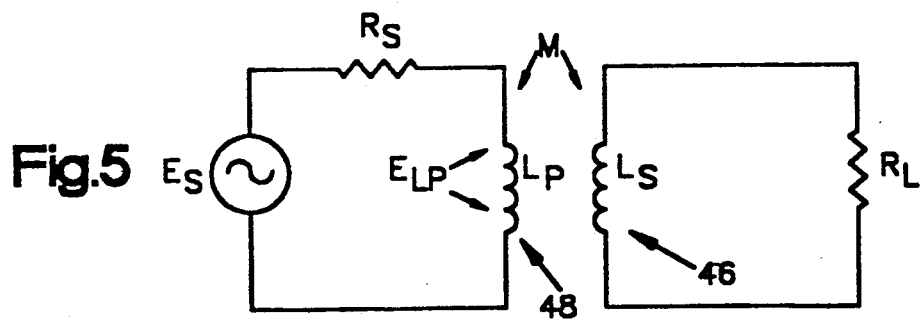
FIG. 5 is an electrical circuit diagram illustrating the principle of the present invention.

The operation of the coils 46 and 48 as well as the generation and utilization of the signal for the end point are shown somewhat schematically in FIGS. 5 through 9. Referring now to FIG. 5, the principle of operation of the perturbance of a magnetic flux in a magnetic-field-producing coil is shown. As shown in FIG. 5, the coil 48 is excited by an AC voltage produced by a common voltage source $E_s$, which has an internal resistance of $R_s$. A voltage $E_{LP}$ is generated across the coil 48 in response to $E_s$. The induced voltage $E_{LP}$ is a function of the reactance $X_{LP}$ of the coil 48, the voltage source $E_s$ and the resistance $R_s$. This can be expressed as follows:

$$E_{LP} = \frac{X_{LP}}{R_s + X_{LP}} E_s$$

where $X_{LP}$ is a function of $R_L$ by virtue of the magnetic coupling, M, between coil 48 and coil 46. Thus, as $R_L$ varies, the induced voltage $E_{LP}$ in the coil 48 varies, hence providing an indication of the load $R_L$.

Figure 6:
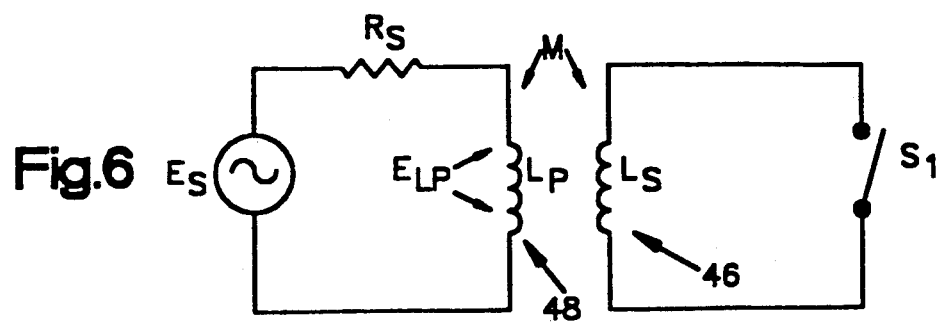
FIG. 6 is a view similar to FIG. 5 showing in diagrammatic form an open switch forming a portion of the electrical circuit of the present invention.

As shown diagrammatically in FIG. 6, if $R_L$ is in fact an open switch, i.e. essentially infinite resistance, then the presence of the coil 46 in the field of the induced electromagnetic field from the coil 48 will not have any effect, i.e. it will not perturb the induced field, and thus, $E_{LP}$ will be, solely a function of $E_s$ and $R_s$. However, depending on the value of the load $R_L$, as shown in FIG. 5, or the opening and closing of the switch shown in FIG. 6, the value $E_{LP}$ will vary as a function of the amount of the load $R_L$ or the position of switch $S_1$.

The operation of the device of the present invention is shown very diagrammatically in FIG. 7 wherein the coil 46 is shown wound in a plane parallel to the table, and one coil 50 and core 58 are shown as the coil 46 rotates with the table (not shown). The coil 46 passes into the air gap 66, of the core 58 and perturbs the induced magnetic field as a function of $R_L$. As can be seen from FIGS. 3 and 4, the value of $R_L$ will change depending upon whether the contacts 42 on the polishing table are in contact with metal or with dielectric on the surface of the wafer. If the contacts 42 are in contact with metal, the circuit will be closed, and it will provide a load which will cause a perturbance of the inductance LD. If, on the other hand, the contacts 42 are in contact with a dielectric, this will be essentially an open circuit with no load, and hence, no perturbance of the magnetically induced field in the core 58 will occur. Thus, a measurement of a perturbation of the magnetic flux will provide an indication of the value of the load which in turn will give an indication as to whether the contacts 42 are contacting a conductor or nonconductor.

It has been found that while it is possible to have the coil 48 utilize an air core or some other gas core, nevertheless, such a core produces a rather small field and the change in inductance or perturbance of the field cannot be easily measured accurately and repetitively to the degree necessary. Hence, the preferred embodiment utilizes the turns of the coil 48 being wound on high permeability, preferably ferromagnetic cores 58, 60, 62 and 64. Likewise, winding coil 46 on a high-permeability core 47 increases the magnetic coupling between coil 48 and coil 46, increasing the perturbance of the field in coil 48 by the varying load impedance $R_L$.

Figure 8:
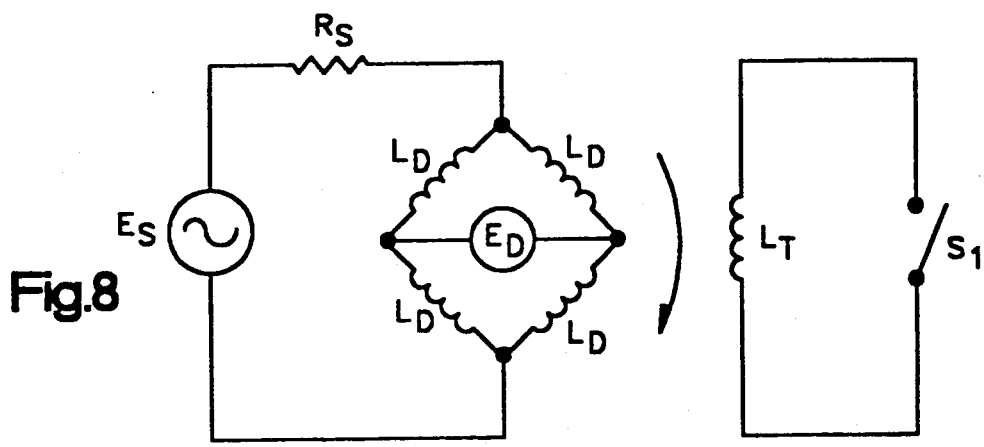
FIG. 8 is a electrical diagram of the bridge circuit configuration of the electrical connection of the stationary coil of the present invention.

It also has been found that with the high permeability of magnetic cores, the perturbance of the magnetic field in any single coil and core amounts to about a 15% change in inductance, and, which while measurable, nevertheless is susceptible to variation due to electromagnetic noise caused by the electrical components deployed for operating the polishing equipment. Thus, the compound four segment coil wound and connected as a bridge circuit, as shown in FIG. 8, is employed to provide a very accurate measurement. Since all the coils of the bridge circuit are similarly influenced, the unbalancing of the bridge will be an accurate rate measurement. This is a conventional bridge circuit with each of the four coil segments 50, 2, 54 and 56 being interconnected as shown in FIG. 8. The voltage $E_s$ is communicated across the top and bottom nodes of the bridge and a voltage $E_D$ is measured across the other nodes. Each of the coils 50, 52, 54 and 56 has the same impedance $X_{LD}$, and hence, $E_D$ is 0 when either the coil 46 is out of any gap 66, 68, 70 or 72 of the cores, or the contacts 42 of the polishing wheel are in contact with dielectric as opposed to metal, irrespective of whether the coil 46 is in or out of an air gap. However, when the coil 46 is brought into any one of the gaps 66, 68, 70 or 72 and there is a circuit between the contacts 42 caused by the detection of metal on the surface of the wafer, the magnetic flux in the particular gap will be perturbed thus causing a change in the impedance of that particular coil which will thus unbalance the bridge and produce a net nonzero voltage $E_D$ in the coil 48. This is a well known phenomenon of a bridge circuit. Also, at this point, it should be noted that the perturbance of the magnetic flux is not a function of the movement or rotation of the coil 46, but is a function of the coil 46 being present in the air gap whether moving or not when there is a load or closed circuit coil 46, movement of the coil not being necessary to produce the perturbance of the magnetic flux field.

Figure 9:
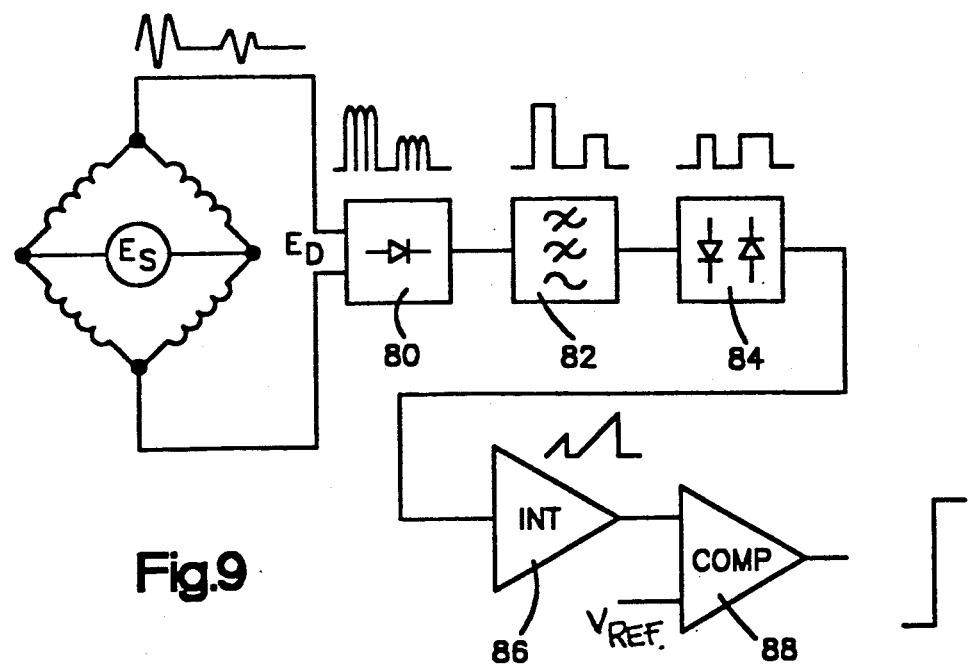
FIG. 9 is a circuit diagram showing somewhat schematically the generation and processing of a signal to determine the end point in lapping or polishing.

It should also be noted that the presence or absence of a signal or voltage induced per se indicates the presence or absence of a film. However, as can be seen in FIG. 2, when polishing to an end point to remove the major surface of the metal layer 14, there will still be areas of metal 14a in the vias 16 and, as such, will form a portion of surface, even though the end point has been reached for this particular polishing. Thus, during rotation of the substrate, there will be periods of time when the contacts 42 form a closed circuit, and hence a load, and periods of time when the contacts 42 form an open circuit, and hence no load with respect to the surface of the wafer. For this reason, the signal must be processed in order to determine if in fact there is just intermediate or sporadic contact generating a load or closed circuit, or whether there is continuous metal contact. This can be accomplished by the circuit as shown in FIG. 9. In this figure, the output from the coil 48 is first supplied to a rectifier 80 where the alternating current is rectified to a wave as shown above the rectifier 80. This rectified wave goes from rectifier 80 to a filter 82, which shapes the pulses as shown above the filter 82, then to a limiter 84 which in effect clips the pulses as shown thereabove and, finally to an integrator 86. The integrator provides a wave form, as shown thereabove, and transmits it to a comparator 88 which provides an output signal. The integrated wave form is an indication as to the amount of surface area that is conductive and which is non-conductive. Since the amount of conductive area at a given end point is known, when the integrated signal reaches a level indicative thereof, the end point has been reached. Thus, the comparison of the integration function can be adjusted such that a signal reversal output occurs when the end point has been reached. This function also compensates for intermittent spikes however caused.

Also, it is to be understood that while the invention has been described as it is utilized to remove a conductive layer down to a non-conductive surface therebelow, it can equally be used to detect the end point when removing a non-conductive surface down to a conducting surface below. In this case, it should be noted also that it is possible to start out with a completely non-conducting surface and remove the material down to a fully conducting or partially conducting surface. The operation of the detector is the same, just the output is utilized differently, i.e. essentially in reverse.

While one embodiment of this invention has been shown and described, various adaptations and modifications can be made without departing from the scope of this invention as defined in the appended claims.

What is claimed:

1. A method of measuring changes in impedance of a variable impedance load, comprising the steps of:

providing a first circuit including a first core having ends which oppose each other and which are separated by an air gap, a first coil wound around said first core, and a current source connected electrically in parallel across said first coil to energize said first coil and induce a magnetic flux density within said air gap;

providing a second circuit including a second core, a second coil wound around said second core, and an electrical contact closure connected electrically in parallel across said second coil;

disposing said second coil within said air gap;

alternatively opening and closing said electrical contact closure to provide said variable impedance load to vary the magnetic flux density within said air gap; and measuring said varied magnetic flux density.

2. The method of claim 1, wherein said second coil is selectively and periodically disposed within and outside of said air gap.

3. The method of claim 1, wherein said current source is an alternating current source, and said magnetic field flux density is measured as a change in voltage across said first coil.

4. The method of claim 2, wherein said second coil and said electrical contact closure are mounted on a platform rotatable with respect to said first coil, and wherein said second coil is selectively and periodically rotated within and outside of said air gap.

5. A method of measuring changes in impedance of a variable impedance load, comprising the steps of:

providing a first circuit including a plurality of first cores each having ends which oppose each other and which are separated by an air gap, a corresponding number of first coils wound around said first cores, said pluralities of coils and cores being arranged as an impedance bridge, and a current source connected electrically in parallel across said impedance bridge to energize said first coils and induce substantially similar magnetic flux densities within said air gaps;

providing a second circuit including a second core, a second coil wound around said second core, and an electrical contact closure connected electrically in parallel across said second coil;

disposing said second coil within one of said air gaps;

alternatively opening and closing said electrical contact closure to vary the magnetic flux density within said one of said air gaps to thereby imbalance the impedance of said impedance bridge by changing the voltage drop across said bridge; and measuring said voltage drop across said bridge.

6. The method of claim 5, wherein said second coil and said electrical contact closure are mounted on a surface of a platform rotatable with respect to said impedance bridge, and wherein said second coil is selectively and periodically rotated within and outside of said air gaps.

7. The method of claim 6, wherein a material to be abraded is positioned on said rotatable platform surface adjacent to said electrical contact closure, said material comprising a substrate having an electrically nonconductive portion deposited thereon and an electrically conductive portions deposited on said electrically nonconductive portion, and wherein said electrically conductive portion is progressively abraded so that said electrically nonconductive material contacts said electrical contact closure.

8. The method of claim 7, further comprising the steps of outputting as an electrical signal the result obtained by measuring said voltage drop across said impedance bridge, integrating said electrical signal to determine the relative time periods during which said electrical contact closure is open and closed, comparing said integrated electrical signal with a reference signal to determine when said progressive abrading of said electrically conductive portion is complete, and outputting a control signal in response to said comparison.

9. The method of claim 8, wherein said electrical signal is rectified and filtered prior to being integrated.

* * * * *